US009148928B2

(12) United States Patent
Park et al.

(10) Patent No.: US 9,148,928 B2
(45) Date of Patent: Sep. 29, 2015

(54) LIGHT EMITTING DIODE DRIVER

(71) Applicant: SAMSUNG ELECTRO-MECHANICS CO., LTD., Suwon, Gyunggi-do (KR)

(72) Inventors: Jung Eui Park, Gyunggi-do (KR); Jin Soo Lee, Gyunggi-do (KR); Byoung Woo Ryu, Gyunggi-do (KR); Seung Kon Kong, Gyunggi-do (KR); Dae Hoon Han, Gyunggi-do (KR); Bo Hyun Hwang, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 29 days.

(21) Appl. No.: 14/163,902

(22) Filed: Jan. 24, 2014

(65) Prior Publication Data

US 2015/0115840 A1 Apr. 30, 2015

(30) Foreign Application Priority Data

Oct. 31, 2013 (KR) .......................... 10-2013-0131560

(51) Int. Cl.
H05B 33/08 (2006.01)
(52) U.S. Cl.
CPC .......... *H05B 33/0851* (2013.01); *H05B 33/083* (2013.01)
(58) Field of Classification Search
USPC ...................... 315/307, 308, 291, 224, 185 R
See application file for complete search history.

(56) References Cited

U.S. PATENT DOCUMENTS

| 8,339,046 B2* | 12/2012 | Kasaba et al. .................. 315/80 |
| 2007/0200512 A1* | 8/2007 | Gotou et al. .................. 315/309 |
| 2011/0001433 A1 | 1/2011 | Lee et al. |
| 2012/0068617 A1* | 3/2012 | Matsuda et al. ............. 315/240 |
| 2012/0319609 A1 | 12/2012 | Choi et al. |

FOREIGN PATENT DOCUMENTS

| KR | 10-0941510 B1 | 2/2010 |
| KR | 10-1029181 B1 | 4/2011 |
| KR | 10-2012-0138876 A | 12/2012 |
| KR | 10-2013-0094078 A | 8/2013 |

OTHER PUBLICATIONS

Korean Office Action issued in Korean Application No. 10-2013-0131560 dated Feb. 24, 2015, with English Translation.

* cited by examiner

*Primary Examiner* — David H Vu
(74) *Attorney, Agent, or Firm* — McDermott Will & Emery LLP

(57) ABSTRACT

There is provided a light emitting diode driver capable of improving power efficiency by using a resistor having a low power consumption rating while controlling an LED channel so that it has constant brightness stably. The light emitting diode driver includes: a power supplying unit converting an input voltage into a predetermined driving voltage so as to supply the driving voltage to an LED channel; and a driving unit amplifying a detection voltage detected based on a current from the LED channel by a predetermined gain and controlling the current flowing through the LED channel so that the amplified detection voltage has a level equal to that of a predetermined reference voltage.

12 Claims, 3 Drawing Sheets

LIGHT EMITTING DIODE DRIVER

CROSS-REFERENCE TO RELATED APPLICATION

This application claims the benefit of Korean Patent Application No. 10-2013-0131560 filed on Oct. 31, 2013, with the Korean Intellectual Property Office, the disclosure of which is incorporated herein by reference.

BACKGROUND

The present disclosure relates to a light emitting diode driver capable of stably controlling current flowing in a light emitting diode channel.

Recently, a light emitting diode (LED) is attracting attention and demanded increasingly.

A device employing such a light emitting diode may be manufactured to be compact, such that it may be accommodated in a relatively small space in which existing electronic devices may not otherwise be able to be accommodated. Further, when such a light emitting diode is used as an illumination apparatus, it is easy to implement the emission of various colors of light and adjust the luminance thereof, such that the light emitting diode may be used in an apparatus for an illumination system appropriate for a situation such as watching a movie, reading, or holding a conference.

In addition, the light emitting diode consumes an amount of power corresponding to ⅛ of the power consumed by a incandescent lamp, has a lifespan of fifty thousand to a hundred thousand hours, 5 to 10 times longer than that of an incandescent lamp, is environmentally-friendly, as a mercury-free light source, and allows for design freedom.

Due to such advantages, LED illumination apparatus development projects have been implemented as nationally-funded projects in many nations, such as the United States of America, Japan and Australia, as well as the Republic of Korea.

Further, recently, as flat panel display technology has evolved, flat panel displays are being employed in instrument clusters for vehicles, as well as in smartphones, game consoles, and digital cameras. In the future, display devices are expected to be more widely utilized in our daily lives, such as in an ultra-thin televisions and transparent navigation devices.

Currently, in the field of displays, relatively new flat panel display (FPD) technology, which meets the requirements of the present era for multimedia displays having features such as high-resolution and large screen sizes, dominates. Particularly, in the large display market, liquid crystal display (LCD) televisions have rapidly grown in popularity, and thus, such a LCD TV is expected to lead the market in terms of price and marketability.

As the flat panel display, a thin film transistor liquid crystal display (TFT-LCD) is mainly used.

Such a TFT-LCD includes a backlight unit emitting light and usually uses cold cathode fluorescent lamps (CCFL) as a back light source. However, recently, LEDs have been used therein, thanks to various advantages such as low power consumption, a long lifespan, and environmentally-friendly characteristics.

Therefore, a relatively inexpensive electronic power system for a backlight unit power module using an LED and an appropriate control element therefor.

An LED as described above requires a driver for the driving thereof. Previously, a switching element has been used to maintain current flowing through LED channels at a constant level. As disclosed in Patent Document 1, a detection resistor may be disposed between one terminal of a switching element and ground in order to maintain the amplitude of current flowing through a plurality of LED channels at a constant level.

Such a resistor has a constant resistance value. In order to detect a current, an amount of power corresponding to the resistance value is consumed, and heat is generated, so that power efficiency may be lowered. If a detection resistor having a low resistance value is used for this purpose, however, the detection voltage level may be so low that an offset may occur, such that it may be difficult to stably control the current flowing through LED channels.

RELATED ART DOCUMENT (Patent Document 1) Korean Patent Publication No. 10-0941510

SUMMARY

An aspect of the present disclosure may provide a light emitting diode (LED) driver capable of improving power efficiency by using a resistor having a low power consumption rating while controlling an LED channel to allow for stable, constant LED brightness.

According to an aspect of the present disclosure, a light emitting diode (LED) driver may include: a power supplying unit converting an input voltage into a predetermined driving voltage so as to supply the driving voltage to an LED channel; and a driving unit amplifying a detection voltage detected based on a current from the LED channel by a predetermined gain and controlling the current flowing through the LED channel so that the amplified detection voltage has a level equal to that of a predetermined reference voltage.

The driving unit may compensate for a voltage offset in controlling the current.

The driving unit may compensate for a voltage offset included in the amplified detection voltage.

The driving unit may compensate for a voltage offset caused by a variation in resistance of a detection resistor used for obtaining the detection voltage.

The driving unit may include: a detection resistor used for detecting current flowing through the LED channel so as to obtain the detection voltage; an amplification unit amplifying the detection voltage by the predetermined gain; an operational amplifier controlling the current flowing through LED channel so that the detection voltage amplified by the amplifying unit has a level equal to that of the reference voltage; a switch adjusting the current flowing through the LED channel by being switched on and off under control of the operation amplifier; and an offset compensation unit compensating for at least one of a voltage offset included in the detection voltage amplified by the amplifying unit, a voltage offset caused by variations in resistance of the detection resistor, and a voltage offset generated by the operational amplifier.

The offset compensation unit may include: a comparator comparing an offset signal with the reference voltage, the offset signal including information on at least one of the voltage offset included in the detection voltage amplified by the amplifying unit, the voltage offset caused by a variation in the resistance of the detection resistor, and the voltage offset generated by the operational amplifier; a voltage generating unit generating a plurality of voltages at a predetermined voltage level interval based on a voltage level of the reference voltage; and a multiplexer selecting one of the plurality of voltages generated by the voltage generating unit based on the comparison result from the comparator so as to transmit the selected voltage to the operational amplifier.

According to another aspect of the present disclosure, a light emitting diode (LED) driver may include: a power supplying unit converting an input voltage into a predetermined driving voltage so as to supply the driving voltage to a plurality of LED channels; and a group of driving units, each of the driving units amplifying a detection voltage detected based on a current from a corresponding LED channel by a predetermined gain and controlling the current flowing through the LED channel so that the amplified detection voltage has a level equal to that of a predetermined reference voltage.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
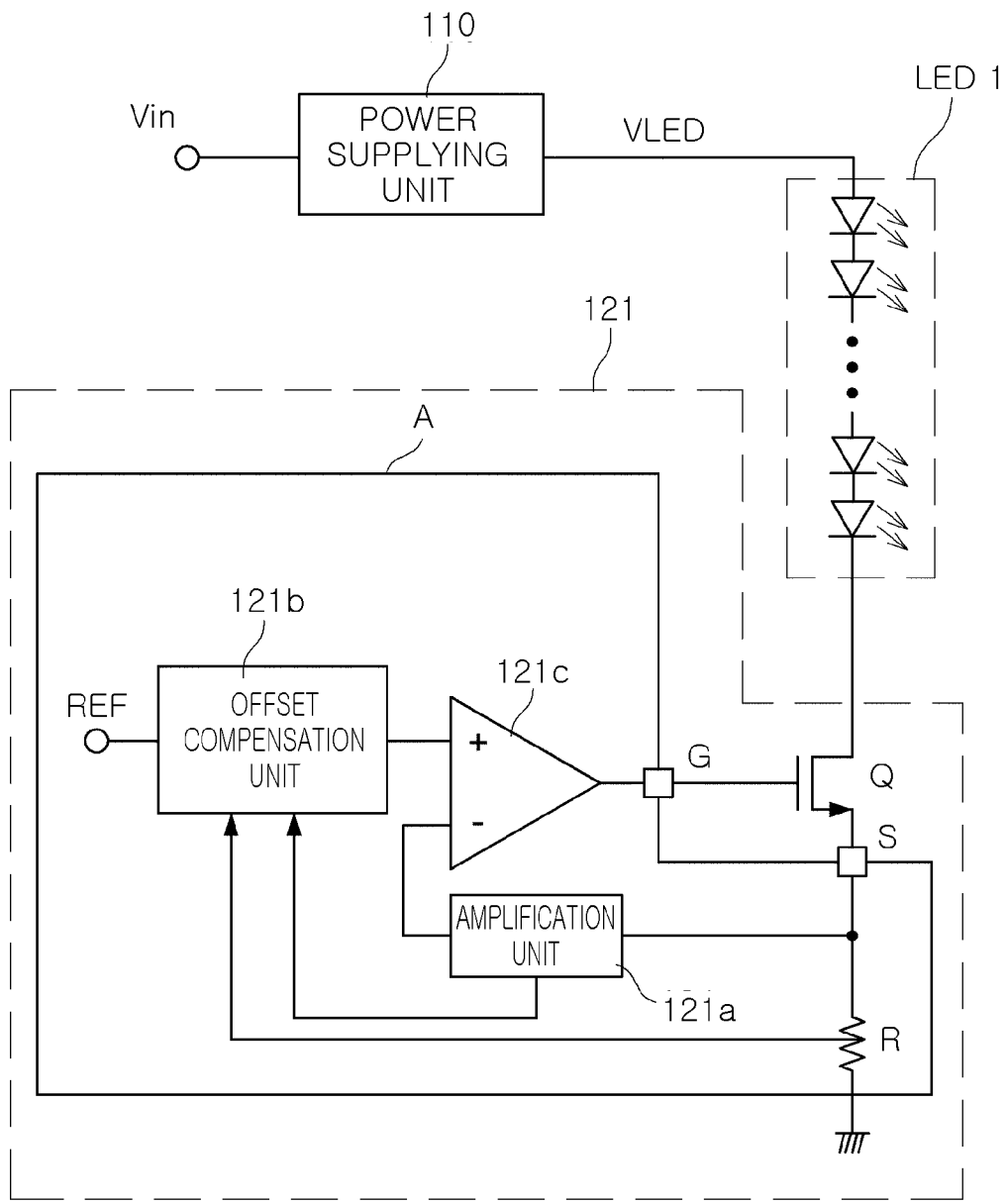
FIGS. 1 and 2 are diagrams schematically showing an LED driver according to an exemplary embodiment of the present disclosure.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. Throughout the drawings, the same or like reference numerals will be used to designate the same or like elements.

Figure 2:
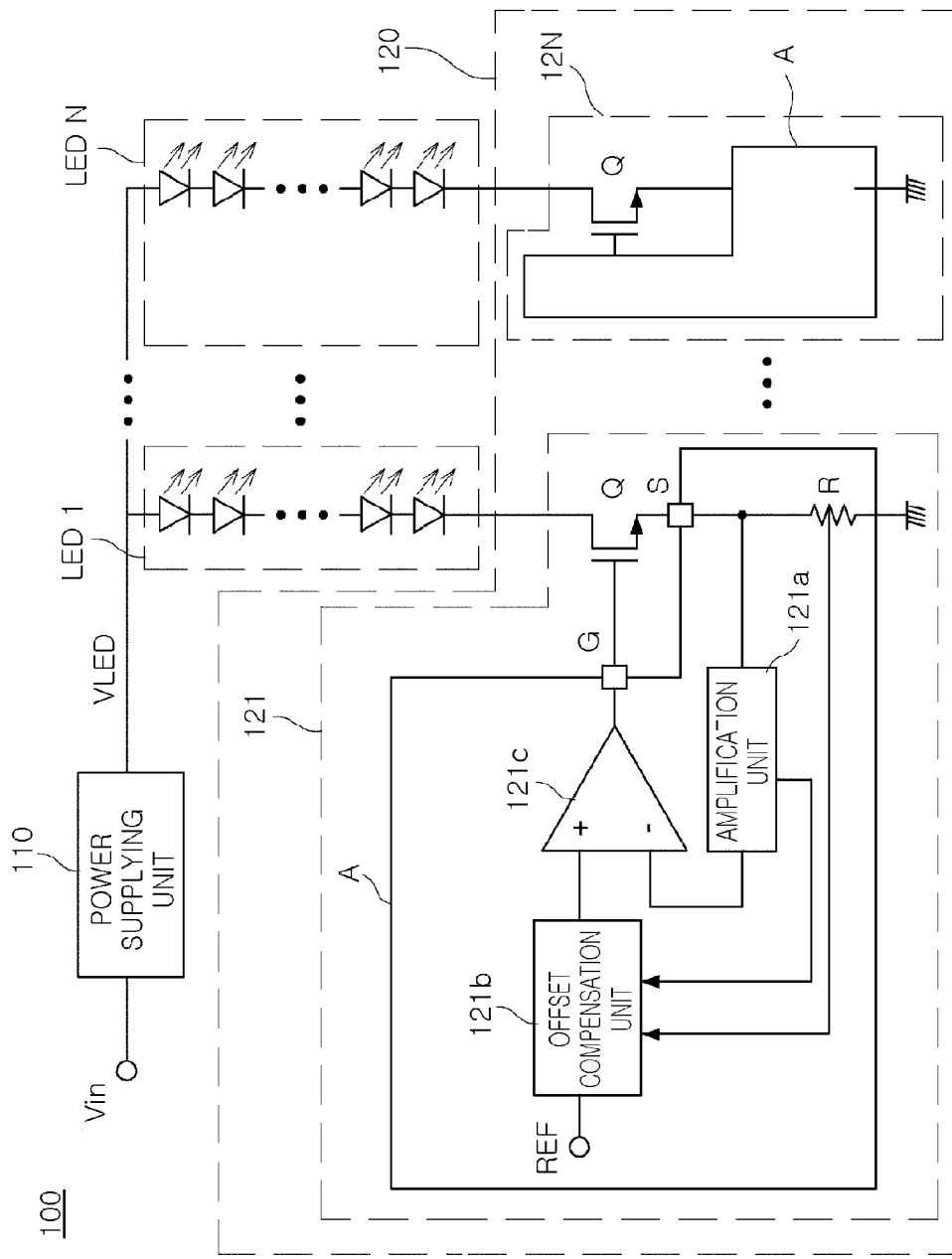

FIGS. 1 and 2 are diagrams schematically showing an LED driver according to an exemplary embodiment of the present disclosure.

Referring to FIGS. 1 and 2, an LED driver 100 according to the exemplary embodiment may include a power supplying unit 110 and a driving unit 121 (in FIG. 1) or a group of driving units 120 (in FIG. 2).

The power supplying unit 110 may convert input voltage Vin into driving voltage VLED according to control so as to apply the driving voltage VLED to an LED channel (in FIG. 1) or to at least one of a plurality of LED channels LED 1 to LED N connected in parallel (in FIG. 2).

Each of the plurality of LED channels LED 1 to LED N may include at least one LED or may include a plurality of LEDs connected in series.

The group of driving units 120 may include driving units 121 each having a switch Q and a driver circuit A for controlling a current flowing through at least one LED channel LED 1. As shown in FIG. 2, each of the LED channels LED 1 to LED N may include respective driving units 121 to 12N, and each of the first to Nth driving units 121 to 12N corresponding to the first to Nth LED channels LED 1 to LED N, respectively, may include a switch Q and a driver circuit A.

The switch Q in the driving unit 121 (in FIG. 1) and the switch Q in each of the first to Nth driving units 121 to 121N (in FIG. 2) may be connected between the terminal of the corresponding LED channel and ground, and may be switched on/off according to a switching signal so as to control current flowing in the LED channel, thereby controlling the brightness of the LEDs.

The driver circuit A in the driving unit 121 (in FIG. 1) and the driver circuit A in each of the first to Nth driving units 121 to 12N (in FIG. 2) may switch on/off the switch Q such that the detection voltage level detected across a detection resistor R through which current from the switch Q flows has a level equal to that of the voltage level of a predetermined reference voltage REF.

The detection resistor R has a resistance value to detect current flowing toward the LED channels LED 1 to LED N through the switch Q. In detecting the current, power is consumed proportionally to the resistance value and heat is generated, so that power efficiency may be lowered.

For this reason, a detection resistor having a low resistance value such as several ohms (Ω) may be used so that a resistor having a rate of low power consumption may be employed and disposed in the driver circuit A which may be implemented as an integrated circuit. In this case, however, if a voltage offset occurs since the level of detection voltage is low, detecting accuracy may be lowered so that it may be difficult to stably control current flowing through the LED channels LED 1 to LED N.

In order to overcome this problem, the driver circuit A in the driving unit 121 (in FIG. 1) and the driver circuit A in each of the first to Nth driving units 121 to 12N (in FIG. 2) may include an amplification unit 121a, an offset compensation unit 121b, and an operational amplifier 121c.

The amplification unit 121a may receive the detection voltage detected by the detection resistor R from an input terminal S so as to amplify the voltage level of the detection voltage by a predetermined gain. The offset compensation unit 121b may compensate for a voltage offset included in the voltage amplified by the amplification unit 121b.

The operational amplifier 121c may output a gate signal to switch on/off the switch Q to an output terminal G such that the voltage level of the detection voltage with the compensated voltage offset has a level equal to that of the voltage level of a reference voltage REF. By doing so, the amount of current flowing through the LED channels LED 1 to LED N may be adjusted so that the brightness of the LED channels LED 1 to LED N may be controlled.

Since the operational amplifier 121c itself may have an offset therein, the offset compensation unit 121b may compensate for the voltage offset by the operational amplifier 121c.

Further, since the detection resistor R is disposed inside the driver circuit A, precision is low so that the resistance value may be varied, and thus a voltage offset may occur in the detection voltage. Therefore, the offset compensation unit 121b may compensate for the voltage offset caused by the variation in resistance value of the detection resistor R.

Figure 3:
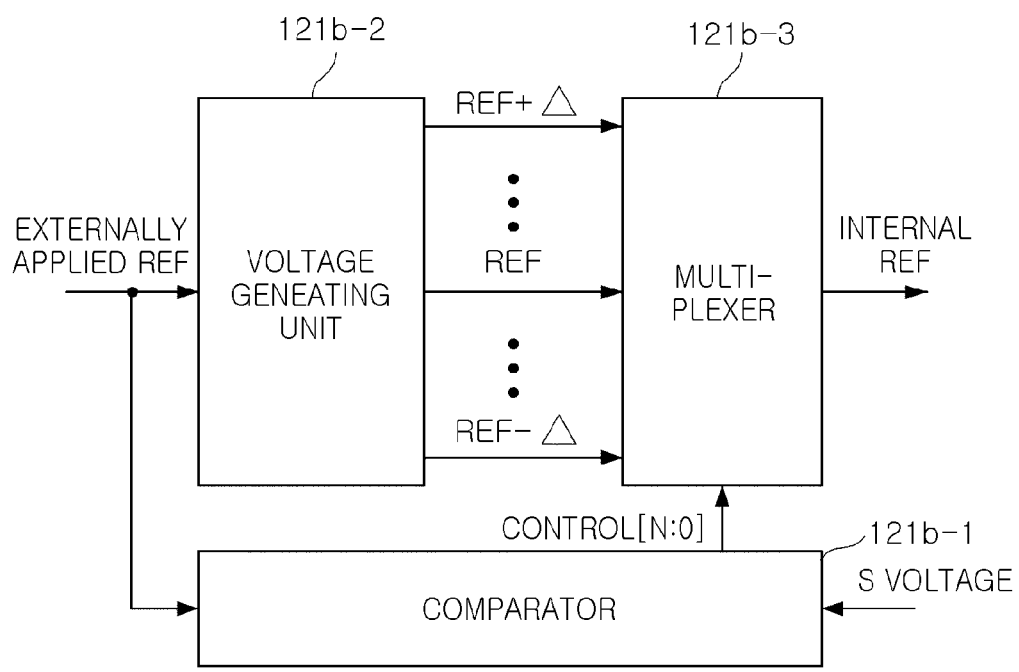
FIG. 3 is a block diagram schematically showing an offset compensation unit employed in an LED driver according to an exemplary embodiment of the present disclosure.

FIG. 3 is a block diagram schematically showing an offset compensation unit employed in an LED driver according to an exemplary embodiment of the present disclosure.

Referring to FIG. 3, the offset compensation unit 121b may include a comparator 121b-1, a voltage generating unit 121b-2, and a multiplexer 121b-3 to compensate for the voltage offset described above.

The comparator 121b-1 may compare an S voltage with a reference voltage REF, where the S voltage may be an offset signal having voltage offset information of at least one of the voltage offset included in the detection voltage amplified by the amplification unit 121a, the voltage offset caused by a variation in the resistance of the detection resistor R, and the voltage offset generated by the operational amplifier 121*c*. The reference voltage REF may be marked as "EXTERNALLY APPLIED REF" in the drawings.

The voltage generating unit 121*b*-2 may receive the reference voltage EXTERNALLY APPLIED REF to generate a plurality of voltages having a predetermined voltage interval based on the reference voltage.

That is, the voltage generating unit 121*b*-2 may generate a plurality of voltages having a predetermined voltage interval Δ based on the reference voltage REF. Specifically, the voltage generating unit 121*b*-2 may generate a voltage REF+Δ higher than the reference voltage REF and may generate a voltage REF−Δ lower than the reference voltage REF. Although one voltage REF+Δ higher than the reference voltage REF and one voltage REF−Δ lower than the reference voltage REF are generated in the shown example, the numbers of the voltages are not limited.

The multiplexer 121*b*-3 may select one of the voltages from the voltage generating unit 121*b*-2 to transmit the reference voltage with the compensated offset (INTERNAL REF) to the operational amplifier 121*c*. The operational amplifier 121*c* may switch on/off the switch Q so that the voltage level of the detection voltage has a level equal to that of the voltage level of the reference voltage with the compensated offset INTERNAL REF.

Figure 4:
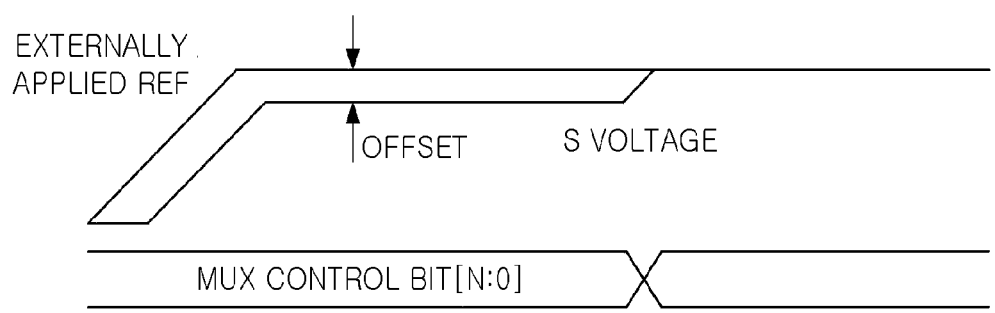
FIG. 4 is a graph showing an operation waveform of the offset compensation unit employed in the LED driver shown in FIG. 3.

FIG. 4 is a graph showing an operation waveform of the offset compensation unit employed in the LED driver shown in FIG. 3.

Referring to FIG. 4 along with FIG. 3, the comparator 121*b*-1 may transmit a control signal Control [N:0] having comparison information to the multiplexer 121*b*-3. The multiplexer 121*b*-3 may select one of the voltages REF, REF+Δ, REF−Δ generated in the voltage generating unit 121*b*-2 according to the control signal Control [N:0] from the comparator 121*b*-1 so as to provide the reference voltage with the compensated offset INTERNAL REF to the operational amplifier 121*c*.

As can be seen from the graph shown in FIG. 4, the voltage offset between the reference voltage EXTERNALLY APPLIED REF and the offset signal (S voltage) is compensated for according to voltage select MUX Control Bit [N:0] from the multiplexer 121*b*-3.

As set forth above, according to exemplary embodiments of the present disclosure, power efficiency may be improved by using a resistor having low power consumption rating while amplifying a detection voltage, and a voltage offset is compensated for so as to control LED channels so that they have constant brightness.

While exemplary embodiments have been shown and described above, it will be apparent to those skilled in the art that modifications and variations could be made without departing from the spirit and scope of the present disclosure as defined by the appended claims.

What is claimed is:

1. A light emitting diode (LED) driver, comprising:
   a power supplying unit converting an input voltage into a predetermined driving voltage so as to supply the driving voltage to an LED channel; and
   a driving unit amplifying a detection voltage detected based on a current from the LED channel by a predetermined gain and controlling the current flowing through the LED channel so that the amplified detection voltage has a level equal to that of a predetermined reference voltage.

2. The LED driver of claim 1, wherein the driving unit compensates for a voltage offset in controlling the current.

3. The LED driver of claim 1, wherein the driving unit compensates for a voltage offset included in the amplified detection voltage.

4. The LED driver of claim 1, wherein the driving unit compensates for a voltage offset caused by a variation in resistance of a detection resistor used for obtaining the detection voltage.

5. The LED driver of claim 1, wherein the driving unit includes:
   a detection resistor used for detecting the current flowing through the LED channel so as to obtain the detection voltage;
   an amplification unit amplifying the detection voltage by the predetermined gain;
   an operational amplifier controlling the current flowing through LED channel so that the detection voltage amplified by the amplifying unit has a level equal to that of the reference voltage;
   a switch adjusting the current flowing through the LED channel by being switched on and off under control of the operational amplifier; and
   an offset compensation unit compensating for at least one of a voltage offset included in the detection voltage amplified by the amplifying unit, a voltage offset caused by a variation in the resistance of the detection resistor, and a voltage offset generated by the operational amplifier.

6. The LED driver of claim 5, wherein the offset compensation unit includes:
   a comparator comparing an offset signal with the reference voltage, the offset signal including information on at least one of the voltage offset included in the detection voltage amplified by the amplifying unit, the voltage offset caused by a variation in the resistance of the detection resistor, and the voltage offset generated by the operational amplifier;
   a voltage generating unit generating a plurality of voltages at a predetermined voltage level interval based on a voltage level of the reference voltage; and
   a multiplexer selecting one of the plurality of voltages generated by the voltage generating unit based on the comparison result from the comparator so as to transmit the selected voltage to the operational amplifier.

7. A light emitting diode (LED) driver, comprising:
   a power supplying unit converting an input voltage into a predetermined driving voltage so as to supply the driving voltage to a plurality of LED channels; and
   a group of driving units, each of the driving units amplifying a detection voltage detected based on a current from a corresponding LED channel by a predetermined gain and controlling the current flowing through the LED channel so that the amplified detection voltage has a level equal to that of a predetermined reference voltage.

8. The LED driver of claim 7, wherein each of the driving units compensates for a voltage offset in controlling the current.

9. The LED driver of claim 7, wherein each of the driving units compensates for a voltage offset included in the amplified detection voltage.

10. The LED driver of claim 7, wherein each of the driving units compensates for a voltage offset caused by a variation in resistance of a detection resistor used for obtaining the detection voltage.

11. The LED driver of claim 7, wherein each of the driving units includes:

a detection resistor used for detecting current flowing through the LED channel so as to obtain the detection voltage;

an amplification unit amplifying the detection voltage by the predetermined gain;

an operational amplifier controlling the current flowing through LED channel so that the detection voltage amplified by the amplifying unit has a level equal to that of the reference voltage;

a switch adjusting the current flowing through the LED channel by being switched on and off under control of the operation amplifier; and an offset compensation unit compensating for at least one of a voltage offset included in the detection voltage amplified by the amplifying unit, a voltage offset caused by variations in resistance of the detection resistor, and a voltage offset generated by the operational amplifier.

12. The LED driver of claim 11, wherein the offset compensation unit includes:

a comparator comparing an offset signal with the reference voltage, the offset signal including information on at least one of the voltage offset included in the detection voltage amplified by the amplifying unit, the voltage offset caused by a variation in the resistance of the detection resistor, and the voltage offset generated by the operational amplifier;

a voltage generating unit generating a plurality of voltages at a predetermined voltage level interval based on a voltage level of the reference voltage; and a multiplexer selecting one of the plurality of voltages generated by the voltage generating unit based on the comparison result from the comparator so as to transmit the selected voltage to the operational amplifier.

* * * * *